Sept. 11, 1934.  E. C. OSGOOD  1,973,672
GREEN CORN KNIFE
Filed Dec. 19, 1931
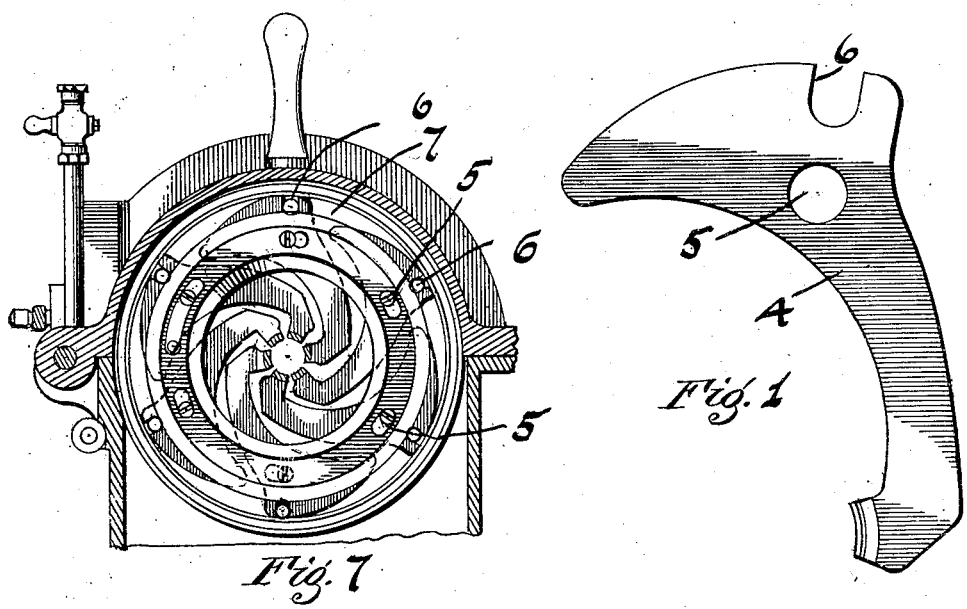
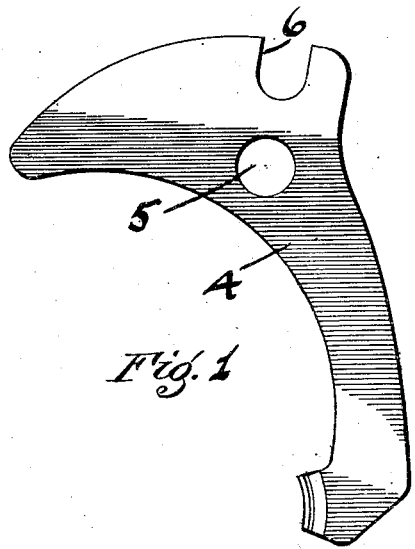
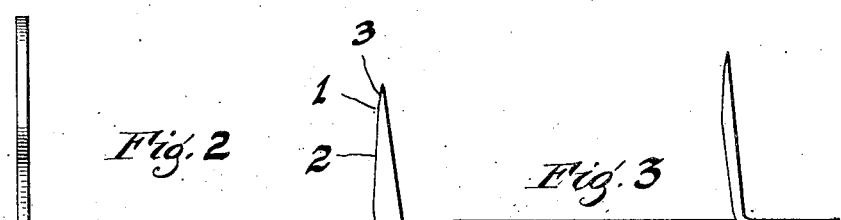
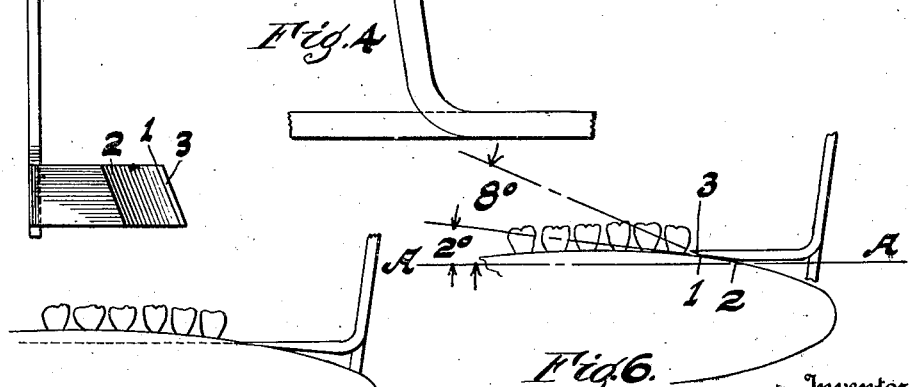

Patented Sept. 11, 1934

1,973,672

UNITED STATES PATENT OFFICE 1,973,672

GREEN CORN KNIFE

Edward C. Osgood, Aberdeen, Md.

Application December 19, 1931, Serial No. 582,120

8 Claims. (Cl. 130—9)

This invention relates to a knife or cutter for use in machines for cutting green corn from the cob in automatic machines and has been designed as a universal knife adapted to the cutting of all grades and kinds of green corn that is packed in cans.

Before the advent of this knife more or less trouble was frequently had in automatic corn cutters, and especially so in those adapted to the cutting of whole grain corn which requires a more accurate adjustment relative to the cob than where other styles of corn are produced, in getting knives that would cut all styles and sizes of ears, it being frequently necessary to change the cutters in a whole battery of machines, requiring considerable time, when certain changes occurred in the corn being handled.

Another trouble frequently encountered was that the points of the ordinary knives tended to dig into certain sizes and shapes of cobs and thereby cut much too deeply for best results.

Practically all previous knife troubles have been overcome by the introduction of this particular knife, in that its cutting edge and shape are so adjusted relative to the outer line of the cob that it automatically adjusts itself to any size and shape of cob and practically never digs into a cob thereby cutting off chaff and scrapings of cob surface that mixes with the product and has to be removed by other operations or if left in the product degrades its quality.

Previous to this invention it was generally thought that a knife edge must have an outside bevel with the flat and straight edge of the knife riding against and along the cob during the cutting operation, and in order to prevent this sharp and straight edge from digging into the cob the under surface of the knife was shaped to ride on the cob after the cut was started. This plan worked very well with certain ears but not so well with other ears with the result that much inferior quality corn was produced and more or less of jamming and clogging of the machine was always present which stopped production for short periods and added greatly to cost of production aside from other objections.

The general principle of this improved knife resides in providing a short bevel just under the cutting edge and a longer bevel extending back from the short bevel to form a riding support for the knives and still give sufficient clearance so the cut edge of the knife will always ride in a certain relation to the cob surface regardless of the size or shape of the ear being handled.

In this knife the small heel formed by the juncture of the two bevels always rides over the surface of the cob and holds the actual cut edge just a little above the surface so that it is practically impossible for the cut edge to ever dig into the cob surface. This results in cutting all of the kernels of each ear at substantially the same distance from the cob surface, thus giving the maximum of kernel volume over the entire ear since all kernels are cut as close to the cob surface as is practical in commercial cutting for canning purposes, and the minimum of chaff and cob surface is removed during the cutting operation resulting in a much improved product which reacts to the benefit of the consumer in giving him a much cleaner and more uniform product than was before possible.

After getting the cut edge properly formed in relation to the knife body the next desideratum is to so mount a set of knives in a cutter head so that they will function in the desired manner, so that the invention consists really of the knife edge and associated parts and the manner of mounting the knives in a cutter head for satisfactory operation in an automatic commercial machine cutting large quantities of corn for canning purposes.

It is therefore a principal object of the invention to provide a knife for cutting green corn from the cob in commercial machines that will be universal in character and thereby adapted to cut kernels in proper manner from all sizes and shapes of ears.

It is a further object of the invention to provide a green corn cutter and manner of mounting so as to cut whole grain kernels with the maximum of kernel volume without including any of the chaff or cob surface with the product.

It is also an object of the invention to provide a short bevel just under the cut edge of the knife to support and guide the cut edge over the cob surface during the cutting operation.

It is also an object of the invention to provide a green corn knife having a combination of bevel surfaces adjacent the cut edge to support the cut edge in relation to the cob surface to produce the maximum efficiency in operation.

It is also an object of the invention to so mount these improved knives in a cutter head of a commercial corn cutter that the cutting edges will all be supported and guided in their operation to produce the theoretical desired results.

With such objects in view as well as other advantages which may be inherent in the invention, consisting in the parts and combinations hereinafter set forth and claimed it is to be understood that the several necessary parts and combination constituting the same may be varied somewhat in their proportions, placement and general arrangement without departing from the scope and nature of the invention, and in order to make the invention more clearly understood there are shown, somewhat diagrammatically, in the accompanying drawing means and mechanism for placing the same in concrete form, without limiting the improvements in their applications to the particular construction chosen to illustrate the invention.

Referring now to the drawing a better and clearer understanding of the invention will be had.

Fig. 1 is a plan of a single knife looking toward the cutting edge.

Fig. 2 is an edge view of Fig. 1 showing the under surface of the cutting portion of the knife.

Fig. 3 is also an edge view showing the angles of the cutter.

Fig. 4 is an enlargement of Fig. 3, giving a clearer detail of the angles.

Fig. 5 is a descriptive view illustrating how some of the older types of knives without the angles of the present invention and illustrates very clearly the manner in which they are likely at any time to dig into the cob and thereby cause trouble or an inferior product.

Fig. 6 is a descriptive view showing how the knife of this invention operates and its relation to the cob and kernels as it cuts the kernels from the cob.

The meat of this invention resides in determining by extensive experiment during several canning seasons, and by trying many different types and shapes of knives during these experiments, the best and most desirable angles to give the knife parts to get the very best results on all kinds and shapes of ears, and by these experiments and tests in actual operation on corn cutting machines in actual commercial use to determine also the variation that may exist in the angular formations and still produce satisfactory if not the very best results. These experiments have demonstrated that two angles are desirable in knives for this purpose, each calculated from a base line that may represent the axis of the ear of corn, or may be just an arbitrary base line, the angles however, should bear a somewhat fixed relation to the line of the surface of the cobs along the line of cut or a composite of this condition so as to act properly on all ears.

Since different grades and varieties of corn have different shaped cobs which also vary according to the length of the ear the problem has been to find some universal condition that would work with the best results with these differing conditions without the necessity of having to change knives each time a different batch of corn came in from the fields.

The angles disclosed herein have been found to give these results in commercial practice in a very high degree, but of course are subject to slight changes without materially affecting the final results or product.

The lower face of the knife that rests on the cob should be so shaped and adjusted that the actual cutting edge cannot come into contact with the cob at any point along the line of cut. This condition has been accomplished in this invention by combining two angular faces to form a supporting heel which rides along the cob and quite effectually holds the actual cutting edge up and away from the cob surface.

This is best seen in Fig. 6 at 1 where the relation of the knife to an ear of corn during the cutting operation is illustrated. There is here shown a base line "A". The long angular face 2 is seen to ride close to the surface of the cob and the short angular face 3 extending from the long angle to the cut edge proper is by the heel 1, formed by the junction of these two faces, held up and away from the cob surface so that it never has a tendency to dig into the cob as does the knife of Fig. 5.

Experiment has demonstrated that the long angle 2 should be approximately 2 degrees from the base line and the short angle 3 approximately 8 degrees from the base line. These angles have given the best all around results on the varying grades and sizes of ears without changing the knives for the changing ear and cob shapes.

It was found during these experiments, however, that these angles need not be adhered to strictly, a slight angular variation will still produce satisfactory results, a greater variance from these angles will begin to recede from the best operative conditions and the inferior product will begin to appear in a slight degree, until when the angles are greatly changed the results may not be at all satisfactory.

It is to be understood of course that Figs. 5 and 6 are merely illustrative and not intended to show an accurate adjustment and setting of the knives in practice, and also the curvature and shape of the ears, kernels and cobs are not accurate representations.

After determining the best shape and angles for the knives it still remained a problem to so mount the knives that the conditions determined by the experiments could be maintained in commercial machine manufacture and operation. It further developed that the angles should be produced on the knives while they were mounted on a cutter head or a special grinding head to hold them in proper position, which position should be that of cutting the kernels from a cob.

It was therefore decided to mount the set of cutters in their exact cutting relation on a head and grind the angles on all of the knives of a set at the one operation by rotating the head carrying the knives while the angles were ground on the faces by a suitable grinding wheel set to the proper angles on its base.

Fig. 7 shows a head which for illustration is one of the regular cutter heads. A head of substantially the same general construction, to hold the cutters in the same relation would be used and mounted in a rotating fixture so that the knives would be rotated during the angular grinding operation. These heads are of somewhat well known construction so that it was thought unnecessary to illustrate one.

The knives 4 are pivoted to a fixed portion of the head at 5 and the slotted end of the knife 6 engages with a movable ring 7 so that as the ring is rotated in the head the knives are expanded to accommodate the shapes and sizes of the cobs.

In a simple grinding head, however the knives would be set and clamped in a fixed position, the head rotated by any suitable means and the angles ground on all of the knives of the set at the one operation by any suitable grinding fixture. This set of knives would then be marked so that they would always constitute a set to be placed in any cutter head when the ground surfaces would always assume the proper relation as when originally ground.

When a cutter head is placed in operation on a commercial machine carrying the knives as described, the ear of corn entering the points of the circle of knives will first touch the heel 1, which will immediately ride up on the cob and thus hold the actual cutting edge up from the cob surface, the cut into the kernels being just above the cob surface. This heel 1 on each knife effectually prevents the cutting edge from ever digging into a normal cob and it has been found that knives shaped and positioned as has been described will work very effectively on all sizes and shapes of cobs in the corn canning varieties of corn.

The initial opening of the knives is such that the largest cob point will enter easily into the bore formed by the circle of knives without gouging into the cob, and since the adjustment for bore opening is easily made this can be changed during operation to accommodate smaller cobs if the general run is smaller than the head was first set for.

In grinding the set of knives in the grinding head the bore formed by the circle of knives is set larger than the smallest cob but less than the largest cob so that the curvature of the bore will accommodate itself to the varying diameters.

What I claim as new and desire to secure by Letters Patent is:

1. A knife for cutting green corn for canning purposes comprising a blade member lying somewhat axially with the ear of corn, two angular surfaces on the side next the cob, the apex of said angles forming a heel portion to ride on the cob, a cutting edge at the extremity of one of said surfaces that is held from contact with the cob by said heel portion.

2. A knife for cutting green corn, a mounting for said knife, a blade member extending substantially at right angles from said mounting, a cutting edge on the end of said extension, an angular surface receding from said cutting edge to form a heel portion with the blade of the knife which heel portion is adapted to ride on the cob and hold the said cutting edge out of contact therewith.

3. A knife for cutting green corn in commercial machines comprising a shank having an arcuate inner edge and a blade member disposed at substantially right angles thereto, a cutting edge on said blade member, a surface receding from said cutting edge toward the under surface of said knife blade member and forming with the under surface thereof a heel portion to rest on the cob while the kernels are cut therefrom.

4. A knife for cutting green corn for canning purposes comprising a flat shank having an undercut inner edge, a blade and a cutting edge on said blade, an angular surface receding from said cut edge on the under side of said blade, and a second angular surface adjoining said first angular surface the combined surfaces acting to form a heel to bear on the cob and adopted to guide the said cut edge along the cob when cutting the kernels therefrom.

5. A knife for cutting green corn for canning purposes comprising a handle and a blade having a cut edge, the surface of the blade next the cob having two adjoining angular surfaces forming a heel portion where they join, the angle from the cut edge to the adjoining surface being approximately eight degrees from a normal base line, and the adjoining surface being approximately two degrees from the same base line.

6. A knife for cutting green corn for canning purposes comprising a handle and a blade having a cut edge, the surface of the blade next the cob having two adjoining angular surfaces forming a heel portion just under the said cut edge, the inclinations of said angular surfaces being such that only the heel is caused to ride on the cob to prevent the cut edge from contacting therewith.

7. An instrument for cutting green corn for canning purposes comprising a head member, a series of knife elements disposed on said head member, blades forming a part of said knife elements, cut edges on the forward ends of said blades, means holding said blades in a predetermined position to form a circular opening for the insertion of the tip of an ear of corn, angular surfaces adjacent said cut edges to form heel members to bear on the cob as it passes by said knives to hold the said cut edges out of contact therewith.

8. An instrument for cutting green corn for canning purposes comprising a head member, a series of flat knife elements all mounted on said head member in a single plane, blades forming a part of said knife elements, cut edges on the forward ends of said blades, means holding all of said blades in a predetermined position to form a circular opening for the insertion of an ear of corn, angular surfaces on the under sides of said blades to form heel members to ride on the cob and hold said cut edges from contact therewith and means associated with said knife elements to move all of said elements at the same time and to the same extent as the ear of corn passes therethrough.

EDWARD C. OSGOOD.